US007860808B2

(12) United States Patent
Peters

(10) Patent No.: US 7,860,808 B2
(45) Date of Patent: Dec. 28, 2010

(54) SYSTEM AND METHOD FOR HYBRID CONSERVATION OF FOSSIL FUEL

(75) Inventor: Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 11/325,903

(22) Filed: Jan. 5, 2006

(65) Prior Publication Data

US 2007/0156257 A1   Jul. 5, 2007

(51) Int. Cl.
*G06Q 10/00* (2006.01)

(52) U.S. Cl. .......................... 705/500; 701/25; 180/2.2

(58) Field of Classification Search .................. 705/1, 705/500; 701/25; 180/2.2
See application file for complete search history.

(56) References Cited

U.S. PATENT DOCUMENTS

| | | | |
|---|---|---|---|
| 6,116,368 A | 9/2000 | Lyons et al. | 180/165 |
| 6,381,522 B1 * | 4/2002 | Watanabe et al. | 701/22 |
| 6,721,644 B2 | 4/2004 | Levine | 701/70 |
| 6,998,727 B2 * | 2/2006 | Gray, Jr. | 290/40 C |
| 7,444,189 B1 * | 10/2008 | Marhoefer | 700/26 |
| 7,519,453 B2 * | 4/2009 | Fairlie et al. | 700/266 |
| 2004/0216777 A1 * | 11/2004 | Pan | 136/246 |
| 2006/0208570 A1 * | 9/2006 | Christian et al. | 307/10.1 |

FOREIGN PATENT DOCUMENTS

| | | |
|---|---|---|
| FR | 2768972 | 4/1999 |
| JP | 2001-112106 | 4/2001 |
| JP | 2003-047110 | 2/2003 |

* cited by examiner

*Primary Examiner*—Janice A. Mooneyham
*Assistant Examiner*—Heidi Riviere
(74) *Attorney, Agent, or Firm*—VanLeeuwen & VanLeeuwen

(57) ABSTRACT

A system and method that optimizes use of renewable energy sources using modern satellites and telemetry to reduce the impact of renewable energy limitations. Location data corresponding to the device is retrieved using GPS technology and a GPS receiver which is located proximate to the device. Renewable energy generators are identified and include generation parameters that indicate the efficiency and output of the devices. Environmental energy factors are retrieved based upon the location data. The amount of available renewable energy is calculated based upon the environmental factors and the renewable energy generation parameters corresponding to each of the renewable energy generators. A travel plan that contains the user's travel intentions can be used. The travel plan indicates future location data as well as device idle time. Collected energy can fuel batteries and can also be used to provide hydrogen to a hydrogen fuel cell.

10 Claims, 6 Drawing Sheets

SYSTEM AND METHOD FOR HYBRID CONSERVATION OF FOSSIL FUEL

BACKGROUND OF THE INVENTION

1. Technical Field

The present invention relates in general to a system and method for conserving fossil fuel. More particularly, the present invention relates to a system and method for optimizing use of renewable energy sources in order to limit fossil fuel requirements.

2. Description of the Related Art

The importance of renewable energy sources is growing on an international scale. Price and demand for fossil fuel continues to rise at an increasing rate. However, from 1996 to 2003 the use of renewable energy sources actually declined. Increased demand for fossil fuel is due to the convenience of using these fuel sources and because, until recently, the price for fossil fuel was relatively inexpensive in comparison to renewable energy sources.

Renewable energy sources can be replenished in a short period of time. The five renewable sources used most often include hydropower (water), solar, wind, geothermal, and biomass. Renewable energy's impact on the world's energy picture is significant. Many important events have occurred during the history of using renewable sources to generate electricity—but the overall use of these fuels declined by about 17 percent from their peak in 1996 to 2003.

The use of renewable energy is not new. Five generations (125 years) ago, wood supplied up to 90 percent of our energy needs. Due to the convenience and low prices of fossil fuels, wood use has fallen. Now, the biomass which would normally present a disposal problem is converted into electricity (e.g., manufacturing wastes, rice hulls, and black liquor from paper production).

Historically, low fossil fuel prices, especially for natural gas, have made growth difficult for renewable fuels. The deregulation and restructuring of the electric power industry could have a major impact on renewable energy consumption. Demands for cheaper power in the short term would likely decrease demand for renewable energy, while preferences for renewables included in some versions of proposed electricity restructuring legislation would breathe new life into this industry.

Use of renewable energy sources in the United States is not currently expected to approach that of the major fuels, and due to their limitations (e.g., their intermittent nature—cloudy days have no solar gain, quiet days mean no wind blows to drive wind turbines, dams are primarily for flood control, so hydroelectricity production varies as dams' water levels change), renewable energy sources may never provide "the" answer to all energy problems. However, around the world, renewable energy is proving to be of great value.

Recently, sharp increases in fossil fuel prices have once again stirred interest in renewable energy sources. However, as mentioned above, limitations of renewable energy sources are significant challenges to widespread adoption and use. Hydrogen powered engines, using hydrogen fuel cells, are another promising new fuel source alternative. However, the challenge with hydrogen power fuel cells is that they use isolated hydrogen which is rarely found in an unbonded state. Instead, electricity is used to separate hydrogen from a bonded state, such as hydrogen as it exists in a water molecule ($H_2O$). Using fossil-fuel based generators to generate the electricity needed is likely to cause additional pollution and global warming. In addition, when in use, hydrogen based vehicles are away from standard power-outlets that could supply electricity to convert bonded hydrogen into hydrogen that can be used in the vehicle.

What is needed, therefore, is a system and method that optimizes use of renewable energy sources using modern satellites and telemetry to reduce the impact of renewable energy limitations. What is further needed, is a system and method that provides renewable energy to a mobile energy consuming device, such as an automobile.

SUMMARY

It has been discovered that the aforementioned challenges are resolved using a system and method that optimizes use of renewable energy sources using modern satellites and telemetry to reduce the impact of renewable energy limitations. The system and method use location data corresponding to the device using GPS technology and a GPS receiver which is located proximate to the device. Renewable energy generators, such as solar energy collectors and wind generators, are identified. These devices include generation parameters that indicate the efficiency and output of the devices. Environmental energy factors, such as sunlight and wind data, are retrieved based upon the location data. One way that environmental energy factors are retrieved is by wirelessly accessing a weather server available on a computer network, such as the Internet. The weather server receives, from the device, the device's location data and responds with environmental energy factors, such as forecasted sunlight data and forecasted wind data. The amount of available renewable energy is calculated based upon the environmental factors and the renewable energy generation parameters corresponding to each of the renewable energy generators.

In one embodiment, the system and method uses a travel plan that contains the user's travel intentions, either based upon historical travel data or based on data provided by the user. The travel plan indicates future location data as well as device idle time. For example, the travel plan might indicate that the user will be at his or her place of business during certain hours. The amount of renewable energy can then be calculated taking the user's travel plans and idle times into account.

In another embodiment, a fossil-fuel based thermoelectric generating device is used to offset any shortfall in energy needs not supplies by renewable energy sources. The system calculates the predicted amount of renewable energy and is thus able to calculate an optimal time to run the fossil-fuel based thermoelectric generating device to charge the device (batteries) to a desired level.

The system and method is also able to use renewable energy sources to power a hydrogen separator that is used to separate hydrogen from a bonded state to an unbonded state that can be used in a hydrogen fuel cell. A reservoir of bonded hydrogen, such as a tank of water, is used to supply the bonded hydrogen.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
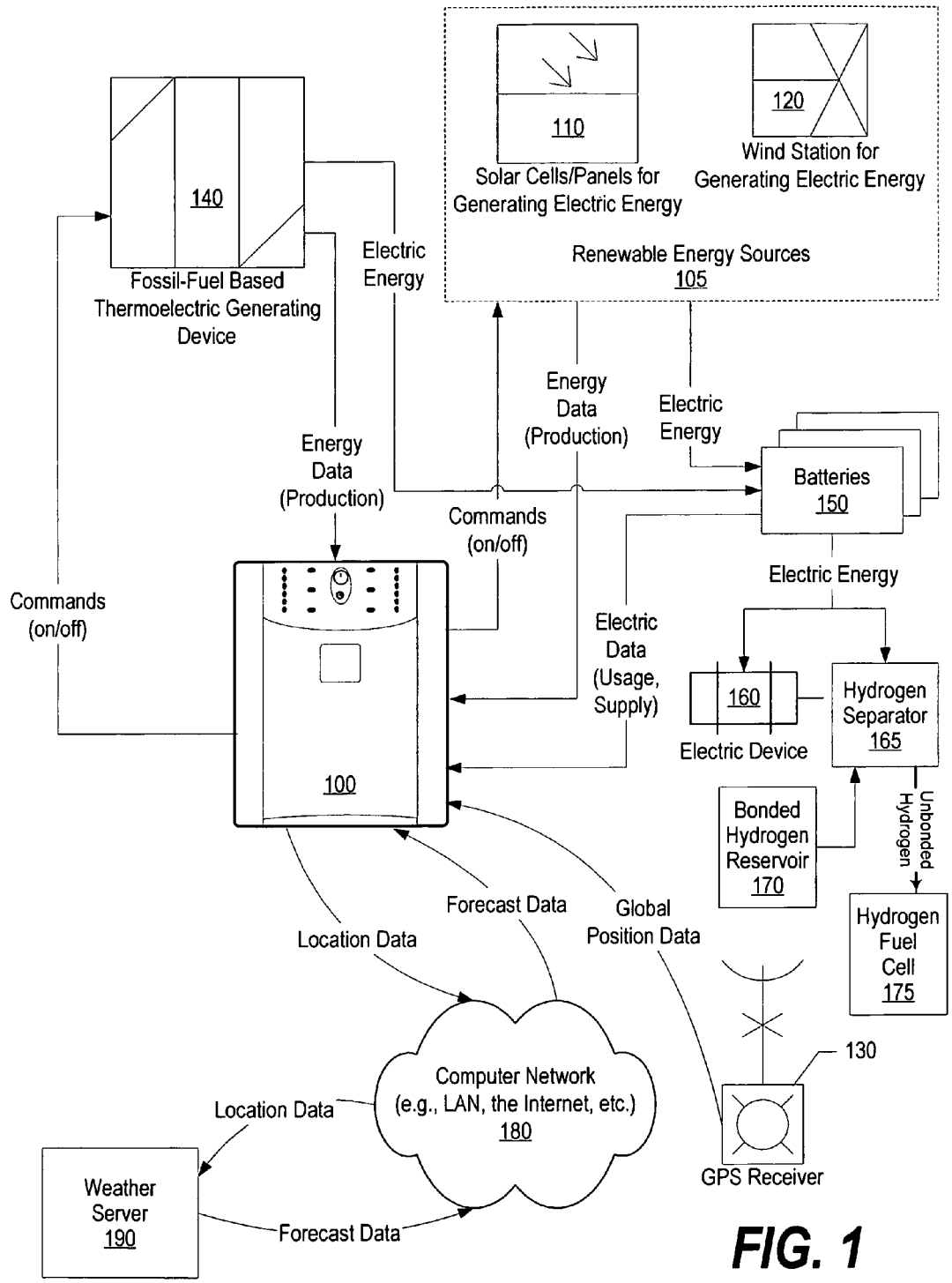
FIG. 1 is a high level diagram showing GPS technology being used with various renewable energy sources in conjunction with a fossil-fuel based generator to optimize use of the renewable energy sources.

FIG. 1 is a high level diagram showing GPS technology being used with various renewable energy sources in conjunction with a fossil-fuel based generator to optimize use of the renewable energy sources. Computer system 100 includes one or more processors, memory, a nonvolatile storage device. Computer system 100 may be embedded in a unit, such as a computer system embedded in an automobile, or may be a stand-alone computer system connected to various energy generating and consuming devices included in the overall system.

Computer system 100 is connected to renewable energy sources 105. One example of a renewable energy source 105 is solar cells/panels 110 used to convert, or generate, electric power from solar energy. Another example of renewable energy source 105 is wind station 120, such as a wind turbine or collector used to convert, or generate, electric power from wind energy. Computer system 100 controls renewable energy sources 105 by sending commands to the renewable energy sources, such as commands instructing a renewable energy source to turn on or off. Computer system 100 receives energy production data from the renewable energy sources so that the computer system can record the amount of energy being generated and determine if enough energy is being produced for the needs of the overall system, such as an automobile. The electric energy produced from renewable energy sources 105 is stored in batteries 150. Batteries 150, in turn, are used to provide electric energy to electric consuming devices, such as electric motor 160 and hydrogen separator 165.

Renewable energy sources 105 work in conjunction with a fossil-fuel based thermoelectric generating device 140, such as a gasoline-powered engine that includes an alternator for generating electric energy. Similar to the renewable energy sources, computer system 100 is electronically connected to the fossil-fuel based thermoelectric generating device. The connection allows computer system 100 to issue commands to the fossil-fuel based thermoelectric generating device and retrieve energy production data from the fossil-fuel based thermoelectric generating device. Computer system 100 determines how much energy is expected to be produced from renewable energy sources 105 over a period of time. If the renewable energy sources are not expected to generate enough electric energy to power the electric consuming devices, then computer system 100 sends command(s) to fossil-fuel based thermoelectric generating device 140 instructing the fossil-fuel based thermoelectric generating device to being generating electric energy using a fossil-based fuel, such as gasoline.

In order to determine, or predict, how much energy the renewable energy sources are expected to produce over a time period, computer system 100 analyzes environmental factors that affect the amount of electric energy created by the renewable energy sources. The computer system needs to identify the device's current location and the weather forecast data corresponding to the current location. To identify the device's current location, Global Positioning Satellite (GPS) receiver 130 is located in a position proximate to the renewable energy sources and provides computer system 100 with global positioning data (location data of the renewable energy sources). Computer system 100 then uses the location data to retrieve weather forecast information from weather server 190. In one embodiment, weather server 190 is a website or computer system accessible through computer network 180, such as the Internet. Weather server 190 receives the location data from computer system 100, looks up the forecast data corresponding to the location, and sends the forecast data back to computer system 100.

Computer system 100 uses the forecast data to predict how much energy can be generated using the renewable energy sources. If the renewable energy sources include solar energy converters and the forecast is for a sunny, cloudless day, then computer system 100 can estimate that more energy can be generated from the solar panels than if the forecast is for a cloudy or rainy day. Likewise, if the renewable energy sources includes wind turbines for collecting wind energy, more energy can be anticipated if the forecast calls for a windy day than if the forecast calls for a calm day with little or no wind. The actual amount of energy that will be generated from the renewable energy sources depends on the characteristics of the individual renewable energy generators, such as the generators' efficiency and other parameters concerning the specific renewable energy generators.

As mentioned before, the electric energy generated by the fossil-fuel based thermoelectric generating device and the renewable energy sources is stored in batteries 150. The energy in the batteries is used to power electric devices, such as electric motor 160 and hydrogen separator 165. In a hydrogen powered vehicle, hydrogen is fed to the anode of hydrogen fuel cell 175. Hydrogen fuel cell 175 uses unbonded hydrogen as a fuel source. In nature, unbonded hydrogen is somewhat rare. Therefore, bonded hydrogen, such as hydrogen bonded to oxygen in water molecules, is used. Hydrogen separator 165 is used to separate hydrogen from water or another bonded state. Hydrogen separator 165 can use electrolysis or other known process for separating the hydrogen. The unbonded hydrogen is then provided to hydrogen fuel cell 175. Reservoir 170 is used to store a supply of bonded hydrogen, such as a tank of water. In addition, the byproduct of the hydrogen fuel cell is often water vapor which can be used to replenish reservoir 170.

Figure 2:
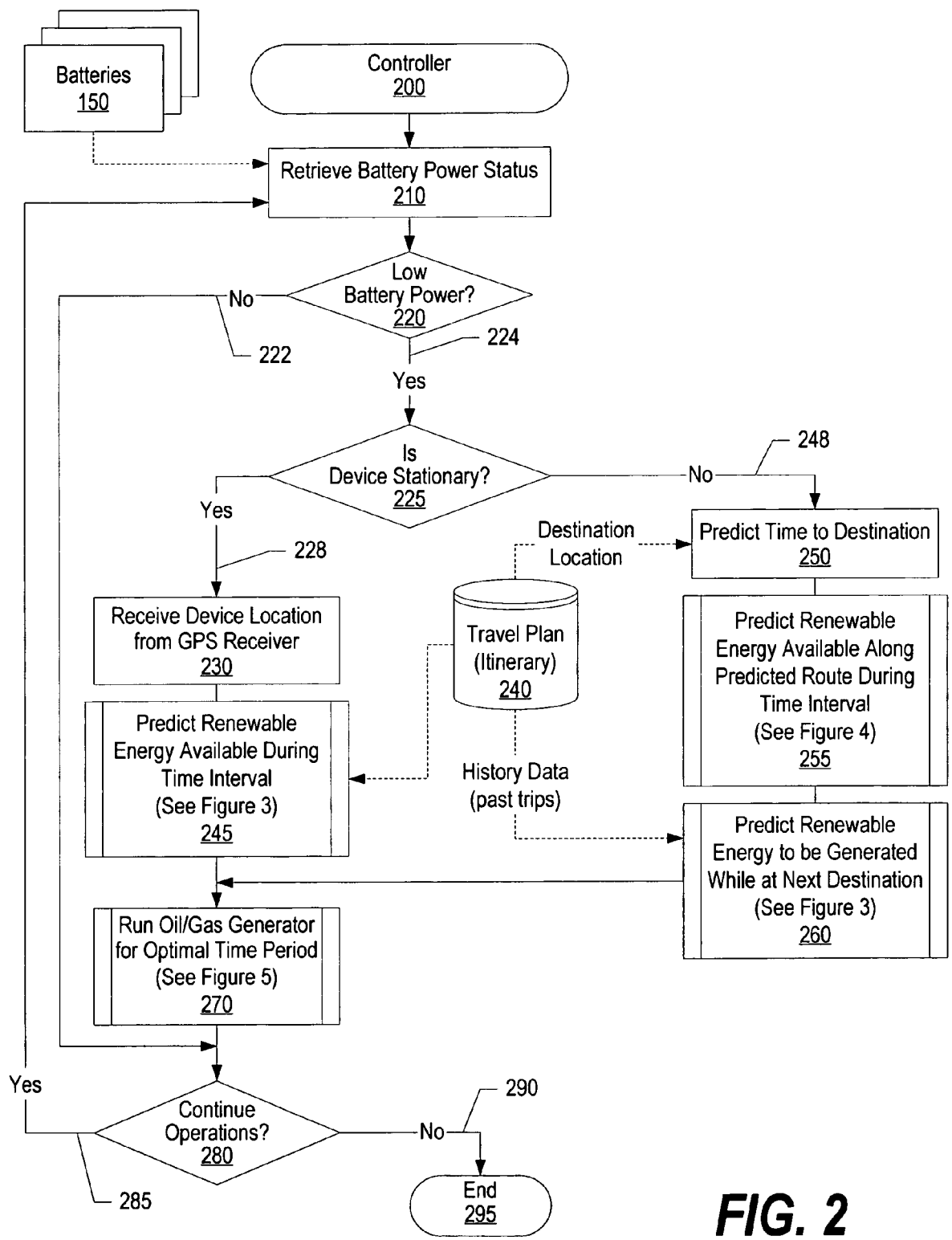
FIG. 2 is flowchart showing logic used to optimize usage of renewable energy sources.

FIG. 2 is flowchart showing logic used to optimize usage of renewable energy sources. Processing of the renewable energy sources' controller commences at 200 whereupon, at step 210, the controller receives battery power status from batteries 150. The controller is a process running in computer system 100 shown in FIG. 1. As the computer system is connected to the renewable energy sources, batteries, and fossil-fuel based thermoelectric generating device (as shown in FIG. 1), it can receive status and data from the various devices and send instructions to the various devices, such as turning the devices on and off.

A determination is made as to whether there is low power as indicated by the battery power status (decision 220). If the battery (or batteries) are not running at low power (and therefore do not need to be recharged), decision 220 branches to "no" branch 222 bypassing the remaining steps. On the other hand, if one or more of the batteries is operating with low power, decision 220 branches to "yes" branch 224 whereupon another determination is made as to whether the device is currently stationary (decision 225). If the device is currently stationary, such as an automobile parked at the user's home or place of business, decision 225 branches to "yes" branch 228 to perform stationary device processing.

At step 230, the device's location is retrieved from the GPS receiver that is located in a position proximate to the device, such as in the user's automobile that is using the renewable energy sources as described herein. Next, a prediction is made as to the amount of renewable energy that will be available during the time interval that the device is stationary (predefined process 245, see FIG. 3 and corresponding text for processing details). Travel plan 240, such as the user's itinerary or travel history data, is retrieved from a nonvolatile storage media. The travel plan helps determine, or predict, the amount of time that the stationary device will be at the location. For example, if the device is the user's automobile and is located at the user's place of business, then the travel plan data might indicate that the user will be at the place of business from 8:00 AM to 5:00 PM, or whatever hours the user typically maintains at the place of business. Travel plan 240 may be updated by the user manually, such as the user indicating when and where the user will be traveling, as well as how long the user is planning on staying at any one location. Travel plan 240 may also be updated by the system by recording the user's habits and patterns, such as recording that the user goes to a certain location, like a place of business, every weekday and remaining there for a period of eight to ten hours. After the amount of renewable energy has been predicted, the fossil-fuel based thermoelectric generating device may be run for an optimal period of time to make up any shortfall not covered by the renewable energy sources (predefined process 270, see FIG. 5 and corresponding text for processing details). For example, predefined process 245 might determine that the renewable energy sources will be able to supply 75% of the energy needed to charge the batteries to the level needed. In that case, the fossil-fuel based thermoelectric generating device would be operated for an amount of time that is needed to provide 25% of the energy needed to charge the batteries to the level needed.

Returning to decision 225, if the device is not stationary, such as a moving automobile being operated by the user, then decision 225 branches to "no" branch 248 in order to determine the amount of renewable energy that can be supplied. At step 250, the destination location is retrieved from travel plan 240 and the amount of time needed to reach the destination is determined based upon the device's current GPS location and the rate of travel or the planned time of arrival (if stored in the travel plan). Next, the amount of renewable energy that will be obtained while traveling to the next destination is predicted (predefined process 255, see FIG. 4 and corresponding text for processing details). In addition, the amount of renewable energy that will be generated while the device is idle at the next location is determined, similarly to the way that the energy available when the device is stationary is determined (predefined process 260, see FIG. 3 and corresponding text for processing details). After the amount of renewable energy has been predicted while the device is traveling as well as when it is stationary at the next destination, the fossil-fuel based thermoelectric generating device may be run for an optimal period of time to make up any shortfall not covered by the renewable energy sources (predefined process 270, see FIG. 5 and corresponding text for processing details). For example, if the user is currently traveling to work and 10% of the needed energy is predicted to be obtained while the user is traveling (taking into account that the user's device is using energy while traveling), and 50% of the energy needed will be obtained while the user's device is idle at work, then the fossil-fuel based thermoelectric generating device will be run for an amount of time estimated to provide 40% of the needed energy to the batteries (100%–10%–50%=40%).

After estimating the amount of energy that will be available/needed from renewable energy sources and the fossil-fuel based thermoelectric generating device, a determination is made as to whether to continue operations (decision 280). If operations are continued, decision 280 branches to "yes" branch 285 which loops back to retrieve an updated battery status and predict the energy that will be available. This continual processing provides for changes in environmental conditions to be taken into account with more accurate predictions made as to how much renewable energy sources will be available. When operations halt, such as the device being completely turned off (including the renewable energy collectors/generators), then decision 280 branches to no branch 290 and processing ends at 295.

Figure 3:
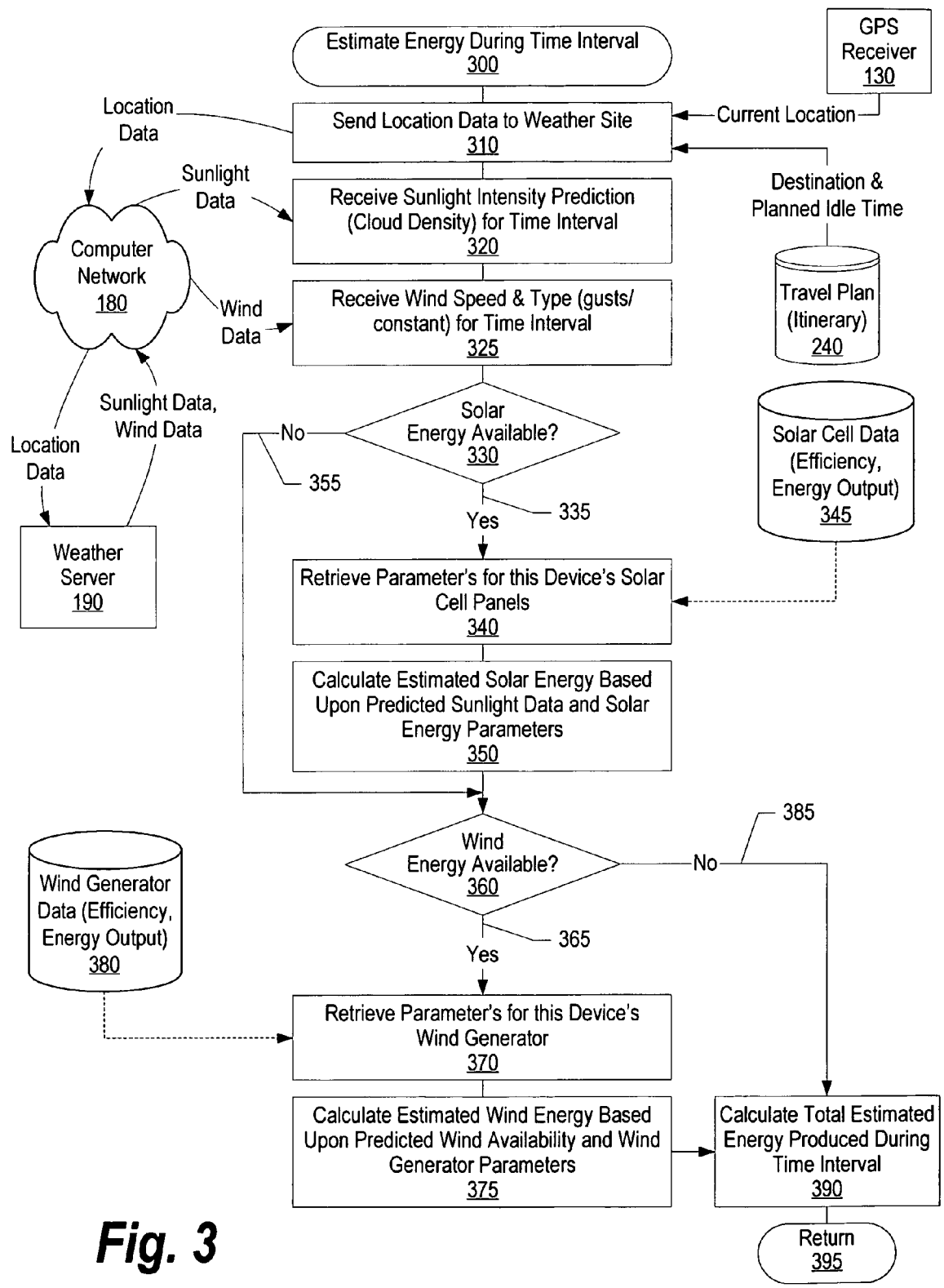
FIG. 3 is a flowchart showing logic that computes the estimated renewable power that will be generated during a time interval.

FIG. 3 is a flowchart showing logic that computes the estimated renewable power that will be generated during a time interval at a particular location. Processing commences at 300 whereupon, at step 310, the device's current or planned location is received (current location retrieved using GPS receiver 130 and a planned location retrieved from travel plan 240), and this location is sent to weather server 190. In one embodiment, the device uses a wireless network connection, such as using mobile telephone technology, to connect to computer network 180, such as the Internet, to send a request and the location data to weather server 190. Weather server 190 responds to the request by sending back environmental data, such as sunlight data and wind data. Sunlight intensity data is received at step 320 and wind data is received at step 325. Sunlight data includes the predicted cloudiness forecasted as well as the sunlight intensity based upon the angle of the sun (i.e., time-of-day information and time-of-year determine angle of the sun in the horizon during the time interval and, thus the intensity of the sunlight). Wind data includes the estimated wind speed and type, such as average constant wind speed and gust speed).

A determination is made as to whether solar power is a possible renewable energy sources (decision 330, i.e., whether the device has solar panels or collectors). If solar power is a possible renewable energy sources, decision 330 branches to "yes" branch 335 whereupon, at step 340, the parameters for the device's solar capabilities are retrieved from solar cell data 345. The solar cell data indicates the efficiency of the device's solar cells at converting sunlight into electrical energy as well as the number of solar cells installed. At step 350, the amount of solar energy that will be produced during the time interval, based upon the solar conditions and the quantity and capabilities of the device's solar cells is estimated. Returning to decision 330, if solar power is not a possible energy source (i.e., no solar cells are installed), then decision 330 branches to "no" branch 355 bypassing steps 340 and 350.

A determination is also made as to whether wind power is a possible renewable energy sources (decision 360, i.e., whether the device has wind energy converter(s)). If wind power is a possible renewable energy sources, decision 360 branches to "yes" branch 365 whereupon, at step 370, the parameters for the device's wind capabilities are retrieved from wind generator data 380. The wind generator data indicates the efficiency of the device's wind generators at converting wind into electrical energy as well as the number of wind generators installed. At step 375, the amount of wind energy that will be produced during the time interval, based upon the wind conditions and the quantity and capabilities of the device's wind generators is estimated. Returning to decision 360, if wind power is not a possible energy source (i.e., no wind generators are installed), then decision 360 branches to "no" branch 385 bypassing steps 370 and 375.

After the amount of energy from renewable energy sources (i.e., solar and wind) has been estimated, the total amount of estimated renewable energy is calculated at step 390. Processing then returns at 395.

Figure 4:
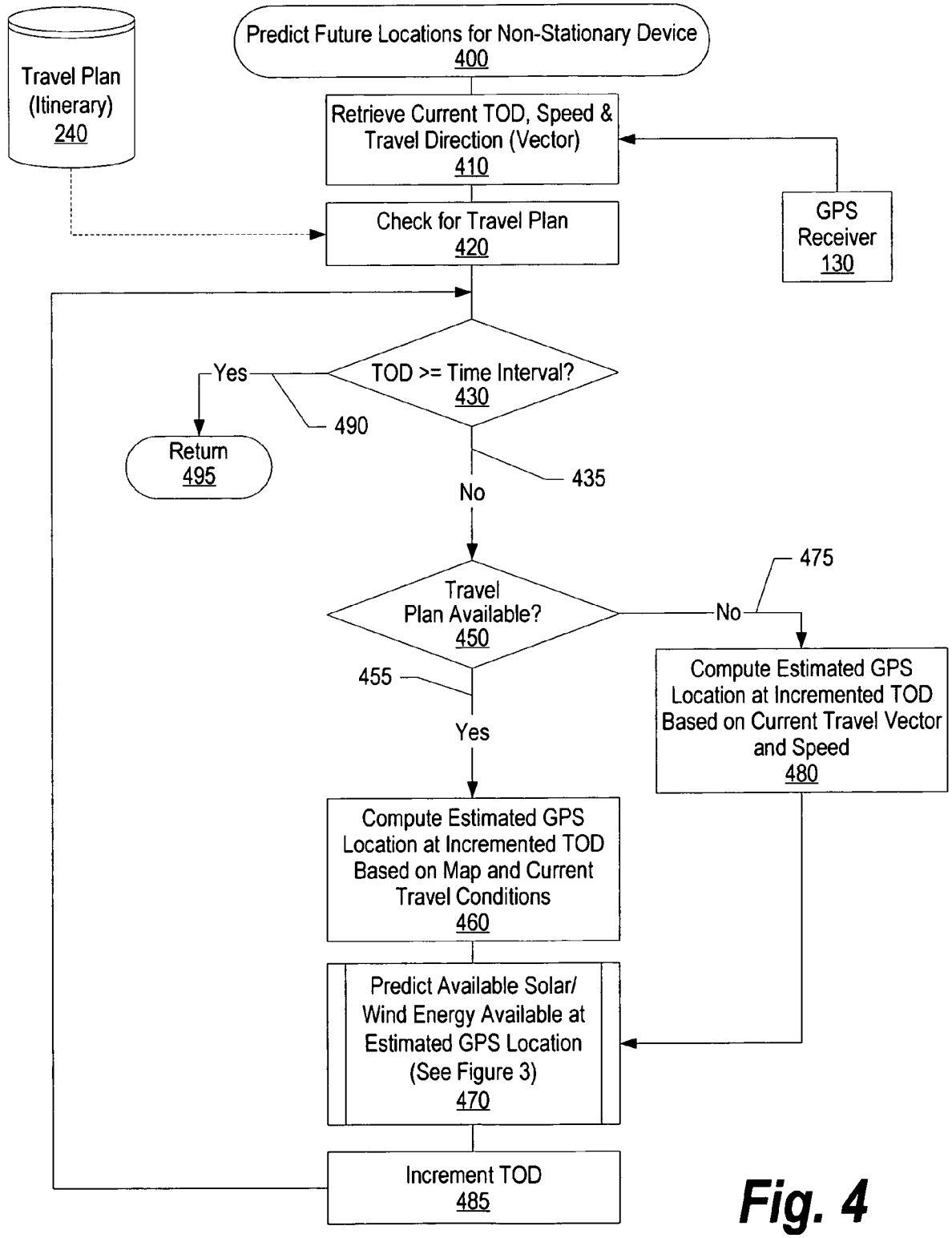
FIG. 4 is a flowchart showing logic for predicting the renewable power that will be generated along a predetermined route during a time interval.

FIG. 4 is a flowchart showing logic for predicting the renewable power that will be generated along a predetermined route during a time interval. Processing commences at 400 whereupon, at step 410, the current location, current time-of-day, speed, and travel direction are retrieved using GPS receiver 130. At step 420, a check is made to see if the user entered a travel plan for the current trip in travel plan data 240. Alternately, the travel plan might be obtained from the onboard GPS system, which may be calculating a route dynamically based on traffic and construction information.

A determination is made as to whether the time-of-day is greater than the planned arrival time (decision 430). If the time-of-day (current or incremented) is not greater than the planned arrival time, decision 430 branches to "no" branch 435 whereupon another determination is made as to whether a travel plan is available for this trip (decision 450). If a travel plan is available, decision 450 branches to "yes" branch 455 whereupon, at step 460, the future location (of an incremented time-of-day) is computed based upon the device's speed and current location. When a travel plan is used, a computation is made as to where the device is likely to be at future point in time, based on the route planned in the travel plan. The amount of renewable energy that will be available at the computed location is then predicted (predefined process 470, see FIG. 3 and corresponding text for processing details).

On the other hand, if a travel plan is not available, decision 450 branches to "no" branch 475 whereupon, at step 480, a future location is estimated based upon the current travel vector and speed. For example, if the time-of-day has been incremented 60 minutes and the device is traveling 60 mph in a northerly direction, then the computed estimated location will be a point 60 miles north of the current location.

At step 485, the time-of-day is incremented in order to simulate the user at different times and different locations throughout the trip. Processing then loops back to compute the estimated renewable energy that will be available at the incremented time-of-day after computing the estimated location where the device will be at the incremented time-of-day. For example, if the user is in a sunny location but traveling towards a rainy location, the estimator will determine that at a future time the device will be in an area with forecasted rain, so the device's solar energy collectors will not be able to collect as much energy from sunlight at the future time. Processing continues to loop back and increment the estimated time (i.e., on five minute intervals), until the incremented time-of-day is greater that the expected arrival time, at which time decision 430 branches to "yes" branch 490 and processing returns at 490.

Figure 5:
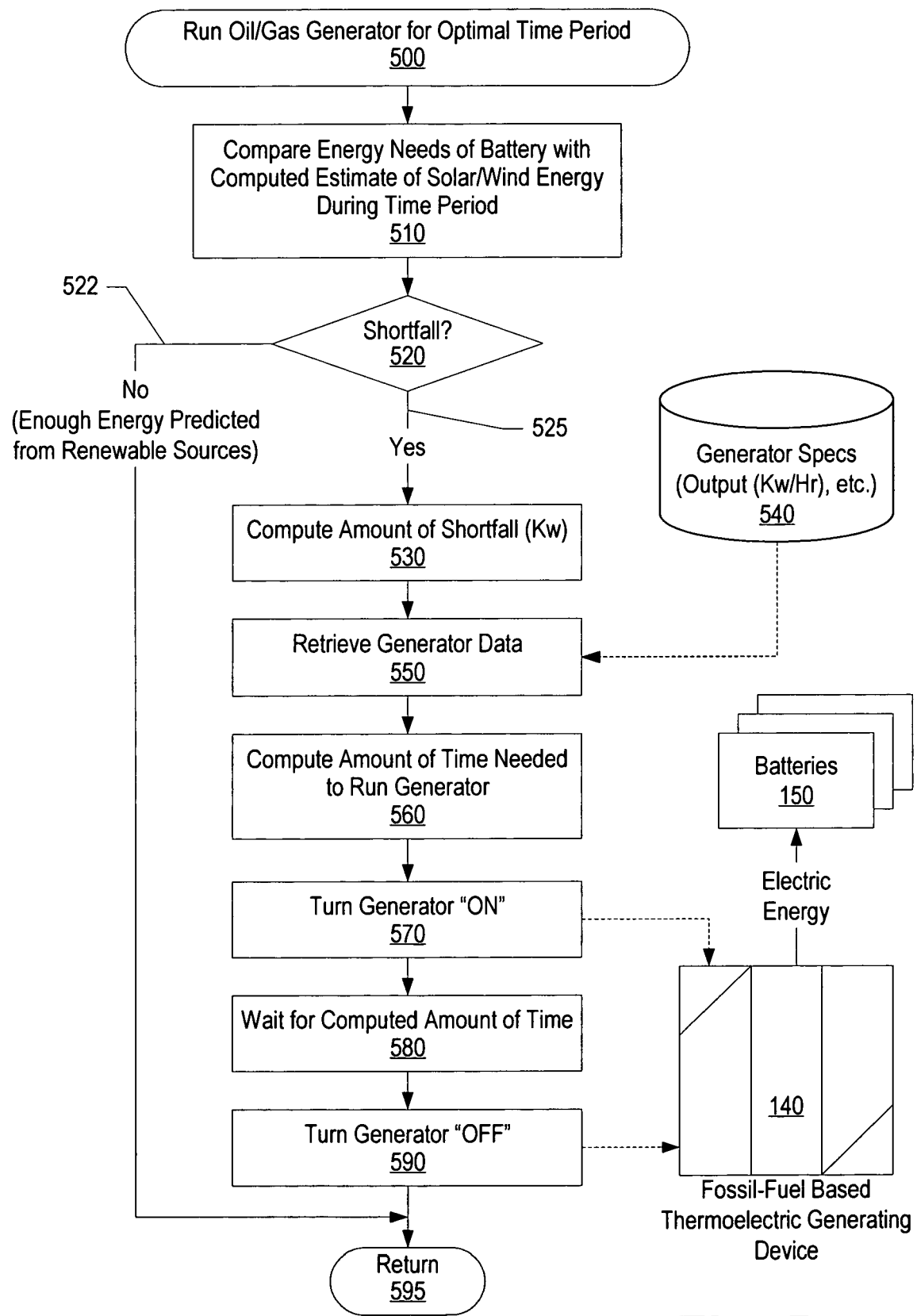
FIG. 5 is a flowchart showing logic for running a fossil-fuel based generator for an optimal period after consideration of energy predicted to be supplied by renewable sources.

FIG. 5 is a flowchart showing logic for running a fossil-fuel based generator for an optimal period after consideration of energy predicted to be supplied by renewable sources. Processing commences at 500 whereupon, at step 510, the energy needs of the device/battery are compared with the estimated amounts of renewable energy that will be produced during the time period. A determination is made as to whether there is a shortfall (decision 520). In other words, a determination is made as to whether enough renewable energy is predicted to be produced or if a fossil-fuel based thermoelectric generating device will be needed to supply the needed power to the device's battery. If there is no shortfall of renewable energy, decision 520 branches to "no" branch 522 bypassing the remaining steps and processing ends at 595.

On the other hand, if there is a shortfall, decision 520 branches to "yes" branch 525 whereupon steps are taken to run the fossil-fuel based thermoelectric generating device for an optimal amount of time. At step 530, the amount of shortfall is computed, for example in kilowatts. At step 550, generators specifications 540 are retrieved detailing the fossil-fuel based thermoelectric generating device's output, such as in kilowatts per hour. At step 560, the optimal amount of run time is computed based on the fossil-fuel based thermoelectric generating device's specifications and the amount of energy needed to alleviate the shortfall. At step 570, fossil-fuel based thermoelectric generating device is turned on. At step 580, the fossil-fuel based thermoelectric generating device is run for the computed amount of time, and at step 590, the fossil-fuel based thermoelectric generating device is turned off. Processing then returns at 595.

Figure 6:
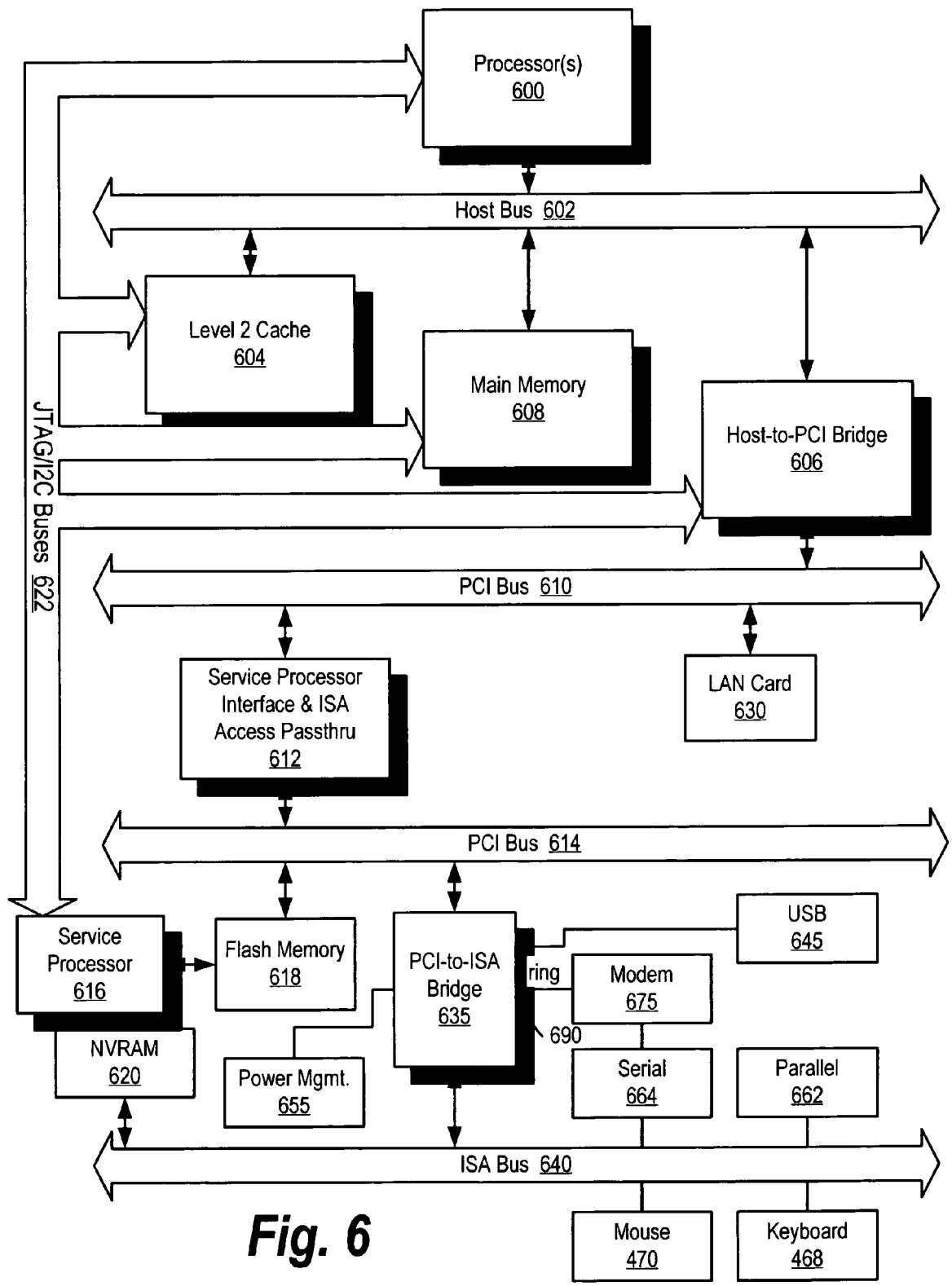
FIG. 6 is a block diagram of an information processing system capable of performing the computations contemplated in the present.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   retrieving, from a nonvolatile storage media, a travel plan corresponding to an energy-consuming device, wherein the energy-consuming device moves along a route between a first location and a second location indicated in the travel plan, and wherein the energy-consuming device includes a fossil-fuel based generator;
   identifying one or more renewable energy generators accessible to the energy-consuming device, wherein each of the renewable energy generators includes a renewable energy type and one or more generation parameters;
   calculating, by a processor, an amount of energy needed for the energy-consuming device to travel from the first location to the second location;
   retrieving one or more environmental energy factors based upon the route and the renewable energy type of each renewable energy generator, wherein one of the retrieved environmental energy factors comprises predicted solar energy data available while the energy-consuming devices travels along the route, the predicted solar energy data comprising forecasted available sunlight data and a forecasted cloudiness rating for one or more intermediate locations between the first location and the second location;
   retrieving one or more solar energy conversion parameters corresponding to a solar power generator, the solar power generator being one of the identified renewable energy generators;
   calculating, by the processor, a first amount of renewable energy available to the energy-consuming device while the energy-consuming device travels along the route, wherein the processor calculates the first amount of renewable energy based upon the predicted solar energy data for each of the intermediate locations and the retrieved solar energy conversion parameters;
   determining that the amount of energy needed is greater than the first amount of renewable energy available;
   in response to the determining, calculating an optimal amount of time to run a fossil-fuel based generator; and
   running the fossil-fuel based generator for the calculated optimal amount of time.

2. The method of claim 1 further comprising:
   determining that the energy-consuming device will be idle for an idle time period at the first location;
   retrieving one or more additional environmental energy factors corresponding to the first location; and
   calculating an additional amount of renewable energy that will be generated at the first location during the idle time period, wherein the calculated additional amount of renewable energy is based upon the additional environmental energy factors corresponding to the first location and the generation parameters corresponding to each of the renewable energy generators.

3. The method of claim 2 further comprising:
   wherein determining that the amount of energy needed is greater than the first amount of renewable energy available further comprises adding the additional amount of renewable energy to the first amount of renewable energy available.

4. The method of claim 1 further comprising:
   requesting, over a computer network, the environmental energy factors from a weather server computer; and receiving, over the computer network, the environmental energy factors from the weather server computer.

5. The method of claim 1 wherein a second one of the environmental energy factors includes predicted wind data available while the energy-consuming device travels along the route, the predicted wind data comprising a predicted average wind speed for each of the intermediate locations, the method further comprising:
- retrieving one or more wind energy conversion parameters corresponding to a wind energy generator, the wind energy generator being one of the identified renewable energy generators; and
- estimating an amount of wind energy that will be generated while the energy-consuming device travels along the route, wherein the estimated amount of wind energy is based upon the predicted average wind speed for each of the intermediate locations and the retrieved wind energy conversion parameters.

6. The method of claim 1 further comprising:
- generating electricity from the renewable energy generators;
- separating hydrogen from a bonded state using the generated electricity; and
- fueling a hydrogen fuel cell with the separated hydrogen.

7. A program product stored in a computer readable medium, the computer readable medium having computer instructions stored thereon that, when executed by an information handling system, cause the information handling system to perform actions comprising:
- retrieving, from a nonvolatile storage media, a travel plan corresponding to an energy-consuming device, wherein the energy-consuming device moves along a route between a first location and a second location indicated in the travel plan, and wherein the energy-consuming device includes a fossil-fuel based generator;
- identifying one or more renewable energy generators accessible to the energy-consuming device, wherein each of the renewable energy generators includes a renewable energy type and one or more generation parameters;
- calculating, by a processor, an amount of energy needed for the energy-consuming device to travel from the first location to the second location;
- retrieving one or more environmental energy factors based upon the route and the renewable energy type of each renewable energy generator, wherein one of the retrieved environmental energy factors comprises predicted solar energy data available while the energy-consuming device travels along the route, the predicted solar energy data comprising forecasted available sunlight data and a forecasted cloudiness rating for one or more intermediate locations between the first location and the second location;
- retrieving one or more solar energy conversion parameters corresponding to a solar power generator, the solar power generator being one of the identified renewable energy generators;
- calculating, by the processor, a first amount of renewable energy available to the energy-consuming device while the energy-consuming device travels along the route, wherein the processor calculates the first amount of renewable energy based upon the predicted solar energy data for each of the intermediate locations and the retrieved solar energy conversion parameters;
- determining that the amount of energy needed is greater than the first amount of renewable energy available;
- in response to the determining, calculating an optimal amount of time to run a fossil-fuel based generator; and
- running the fossil-fuel based generator for the calculated optimal amount of time.

8. The program product of claim 7 wherein the actions further comprise:
- determining that the energy-consuming device will be idle for an idle time period at the first location;
- retrieving one or more additional environmental energy factors corresponding to the first location; and
- calculating an additional amount of renewable energy that will be generated at the first location during the idle time period, wherein the calculated additional amount of renewable energy is based upon the additional environmental energy factors corresponding to the first location and the generation parameters corresponding to each of the renewable energy generators.

9. The program product of claim 8 wherein the actions further comprise:
- wherein determining that the amount of energy needed is greater than the first amount of renewable energy available further comprises adding the additional amount of renewable energy to the first amount of renewable energy available.

10. The program product of claim 7 wherein the actions further comprise:
- requesting, over a computer network, the environmental energy factors from a weather server computer; and
- receiving, over the computer network, the environmental energy factors from the weather server computer.

* * * * *